(12) United States Patent
Myers et al.

(10) Patent No.: US 8,970,115 B2
(45) Date of Patent: Mar. 3, 2015

(54) DELAYING STARTUP UNDER FAULT CONDITIONS

(71) Applicant: iWatt Inc., Campbell, CA (US)

(72) Inventors: Richard M. Myers, Grass Valley, CA (US); Clarita C. Poon, Pleasanton, CA (US); Liang Yan, Milpitas, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 75 days.

(21) Appl. No.: 13/774,513

(22) Filed: Feb. 22, 2013

(65) Prior Publication Data

US 2013/0257280 A1 Oct. 3, 2013

Related U.S. Application Data

(60) Provisional application No. 61/616,749, filed on Mar. 28, 2012.

(51) Int. Cl.
H05B 37/00 (2006.01)
H05B 37/03 (2006.01)
H05B 33/08 (2006.01)

(52) U.S. Cl.
CPC .......... *H05B 37/038* (2013.01); *H05B 33/0815* (2013.01); *H05B 33/0887* (2013.01); *Y02B 20/347* (2013.01)
USPC ................ 315/122; 315/64; 315/94; 315/307

(58) Field of Classification Search
USPC ......................................................... 315/122
See application file for complete search history.

(56) References Cited

U.S. PATENT DOCUMENTS

| 7,157,889 | B2 * | 1/2007 | Kernahan et al. | 323/268 |
| 8,395,329 | B2 * | 3/2013 | Jutras et al. | 315/291 |
| 8,415,901 | B2 * | 4/2013 | Recker et al. | 315/307 |
| 8,519,566 | B2 * | 8/2013 | Recker et al. | 307/64 |
| 2005/0093463 | A1 | 5/2005 | Jang et al. | |
| 2006/0279970 | A1 * | 12/2006 | Kernahan | 363/65 |
| 2007/0242488 | A1 | 10/2007 | Baurle et al. | |
| 2013/0063027 | A1 * | 3/2013 | Recker et al. | 315/86 |
| 2013/0193879 | A1 * | 8/2013 | Sadwick et al. | 315/307 |
| 2013/0242625 | A1 * | 9/2013 | Yan et al. | 363/49 |
| 2013/0249437 | A1 * | 9/2013 | Wang et al. | 315/307 |
| 2013/0257280 | A1 * | 10/2013 | Myers et al. | 315/122 |

FOREIGN PATENT DOCUMENTS

| CN | 1929230 A | 3/2007 |
| CN | 102026442 A | 4/2011 |
| CN | 102301824 A | 12/2011 |

OTHER PUBLICATIONS

State Intellectual Property Office of the People's Republic of China, First Office Action, Chinese Patent Application No. 201310108873. x, Sep. 26, 2014, eighteen pages.

* cited by examiner

*Primary Examiner* — Douglas W Owens
*Assistant Examiner* — Srinivas Sathiraju
(74) *Attorney, Agent, or Firm* — Fenwick & West LLP

(57) ABSTRACT

A LED lamp that includes a LED lamp controller with delayed startup after a fault condition is detected. The type of the fault condition is used in determining a length of the startup delay, such as a number of power cycles during which the LED lamp controller is prevented from completing its configuration. Examples of different types of fault conditions include faults in a supply voltage or faults in a feedback voltage to the LED lamp controller. Fault type information can also be stored in circuitry that retains data and is not reset across the power cycles.

21 Claims, 5 Drawing Sheets

DELAYING STARTUP UNDER FAULT CONDITIONS

CROSS REFERENCE TO RELATED APPLICATION

This application claims priority from U.S. Provisional Patent Application No. 61/616,749, filed on Mar. 28, 2012, the contents of which are incorporated by reference herein in their entirety.

BACKGROUND

1. Field of the Disclosure

The present disclosure relates to a light emitting diode (LED) lamp controller, and more specifically to a LED lamp controller with delayed startup under fault conditions.

2. Description of the Related Arts

A controller circuit for a LED lamp must detect and respond appropriately to many potential fault conditions. Generally, when a fault is detected, the controller circuit stops driving its output pins and enters a shutdown state to prevent any further damage from occurring. After some amount of time, the controller restarts and the LED lamp will be powered up if the fault condition has been removed. During each restart, the controller enters a configuration state during which the internal parameters affecting operation of the controller are configured. Once the configuration state is completed, the controller enters a regulation state and begins to regulate current to the LEDs of the LED lamp.

If the fault condition is still present, the controller will shut down again, and the power cycle will be repeated. A high amount of power consumption in the LED lamp can occur during the time that the controller is in the configuration state due to the way in which the controller is driving the circuitry of the LED lamp. Repeated power cycles cause thermal stress on circuitry in the LED lamp if the amount of time spent in the configuration states is too long.

To reduce the thermal stress during repeating power cycles, once a fault is detected, conventional LED lamp drivers prevent the LED lamp driver from completing the start up process for a fixed number of subsequent power cycles. However, conventional LED lamp controllers are fairly simplistic and use a one-size fits all approach that treats all fault conditions in the same manner, regardless of the severity of the fault. In addition, fault detection circuits in conventional LED controllers are limited in the types of faults that they can detect.

SUMMARY

Embodiments of the present disclosure include a LED lamp with an LED lamp controller that delays startup of the LED lamp controller under fault conditions. In one embodiment, the LED lamp includes one or more LEDs emitting light in accordance with current flowing through the LEDs. A LED lamp controller is configured to generate a control signal for regulating the current flowing through the LEDs. The LED lamp controller is powered by a power supply voltage and operates in power cycles according to a voltage level of the power supply voltage. For example, each power cycle may begin as the supply voltage rises above a reset threshold voltage and end as the supply voltage falls below the reset threshold voltage. During a configuration state of each power cycle, the LED lamp controller initializes parameters affecting operation of the LED lamp controller, such as a parameter indicating a type of dimmer switch coupled to the LED lamp.

During a first power cycle, a fault condition occurs in the LED lamp and the LED lamp controller detects the type of the fault condition. During second power cycles that are subsequent to the first power cycle, the LED lamp controller is configured to prevent completion of the configuration state (e.g., by preventing the configuration state from starting or by discontinuing the configuration state after it starts). The LED lamp controller is also configured to control a number of the second power cycles during which the completion of the configuration state is prevented based on the type of the detected fault condition. The LED controller thus varies a delay between when a fault condition is detected and when the LED controller is permitted to start up properly according to the type of fault condition that is detected.

In one embodiment, the LED lamp controller can include a portion that is reset across power cycles and a portion that is not reset across power cycles. Information about a type of the fault condition can be stored in the portion of the LED lamp controller that is not reset across power cycles and used in later power cycles to control the number of the second power cycles in which the configuration state is prevented from completing. In one embodiment, the fault condition is a fault in the supply voltage or a fault in a voltage feedback signal to the LED lamp controller. In one embodiment, the second power cycles may be immediately subsequent to the first power cycle or may not be immediately subsequent to the first power cycle.

In one embodiment, a method of operation in the LED lamp controller is disclosed. The method comprises, detecting a type of a fault condition of the LED lamp during a first power cycle of the power cycles. The method also comprises preventing completion of the configuration state in second power cycles that are subsequent to the first power cycle. A number of the second power cycles during which completion of the configuration state is prevented is controlled based on the type of the fault condition.

In one embodiment, a light emitting diode (LED) lamp controller for an LED lamp is disclosed. The LED lamp controller includes a control pin configured to generate a control signal for regulating current flowing through one or more LEDs of the LED lamp. A power supply pin is configured to receive a supply voltage. The LED lamp controller operating in power cycles according to a voltage level of the supply voltage, each power cycle including a configuration state during which one or more parameters affecting operation of the LED lamp controller are initialized. The LED lamp controller is configured to detect a type of a fault condition of the LED lamp during a first power cycle of the power cycles. The LED lamp controller is configured to prevent completion of the configuration state in second power cycles that are subsequent to the first power cycle. The LED lamp controller is configured to control a number of the second power cycles during which completion of the configuration state is prevented based on the type of the fault condition.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

According to various embodiments of the present disclosure, a LED lamp includes a LED controller with delayed startup after a fault condition is detected. The type of the fault condition is used in determining a length of the startup delay in subsequent power cycles, which allows different types of fault conditions to have different startup delays that are appropriate for the nature of the fault. Fault type information is stored in circuitry that retains data and is not reset across the power cycles. Additionally, fault detection circuitry may detect a fault condition by comparing a power supply voltage to a threshold that is above a reset threshold, which allows for detection of faults that would cause power cycling without being detected.

Figure 1:
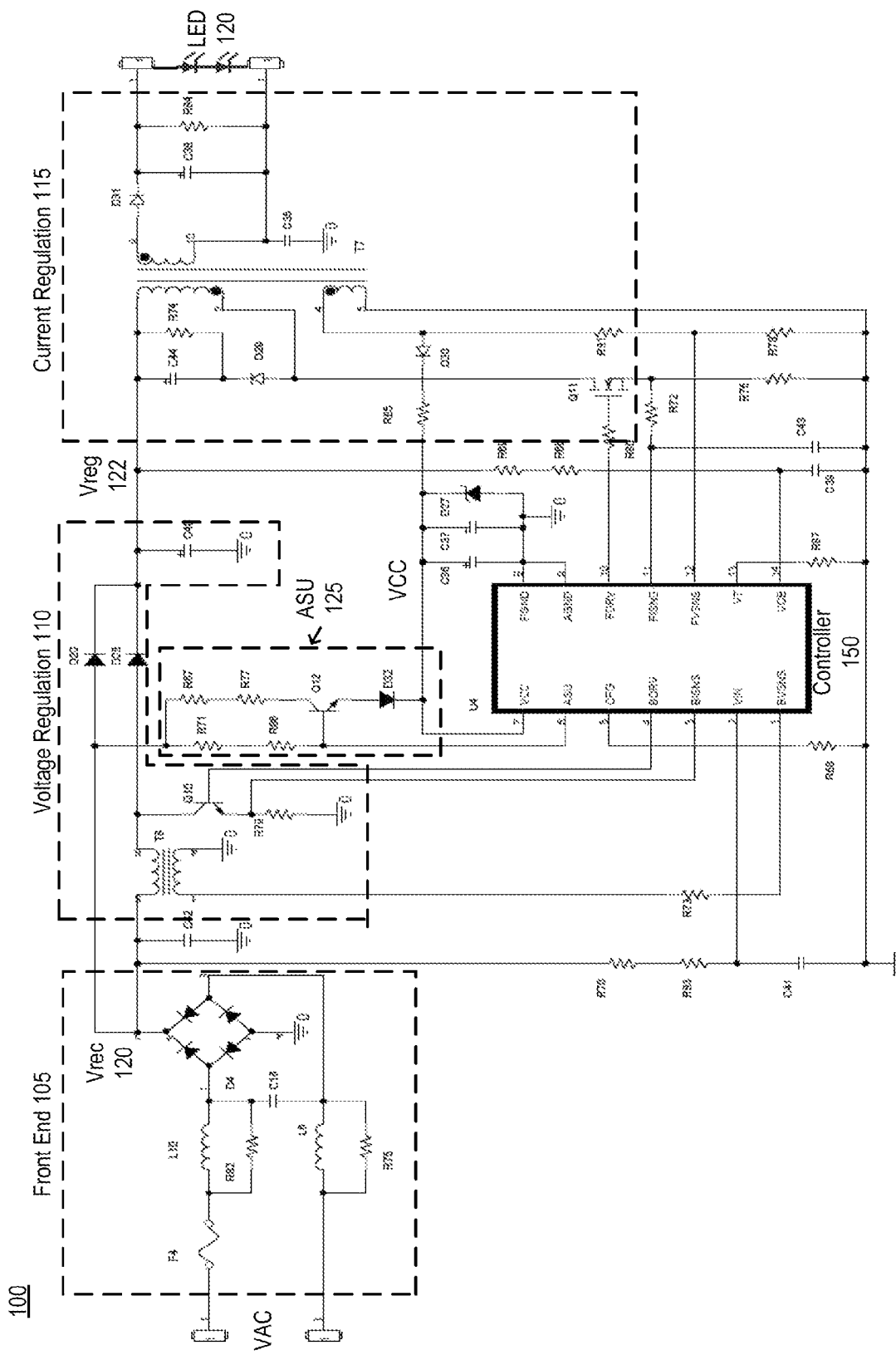
FIG. 1 illustrates components of an LED lamp, according to an embodiment.

FIG. 1 illustrates components of an LED lamp 100, according to an embodiment. The LED lamp 100 includes four principal sections: a front end stage 105, a voltage regulation stage 110, a current regulation stage 115, and an active start up (ASU) stage 125. Together the stages generate a regulated current through one or more LEDs 120 that cause the LEDs to emit light in accordance with a level of the regulated current.

The front end stage 105 includes components such as fuse F4, inductor L10, resistor R82, inductor L6, resistor R75, and bridge rectifier D4. The front end stage 105 receives an AC input voltage VAC and may be connected to a dimmer switch (not shown) that is external to the LED lamp 100. The front end stage 105 rectifies the AC input voltage VAC and generates a rectified input voltage (Vrec) 120 from the AC input voltage VAC.

The voltage regulation stage 110 is coupled to an output of the front end stage 105 and includes a transformer T8, transistor switch Q10, resistor R79, diode D20, diode D28, and capacitor C40. The voltage regulation stage 110 is configured as a boost converter that receives the rectified input voltage (Vrec) 120 and generates a regulated voltage (Vreg) 122. The regulated voltage 122 may have a higher voltage level (i.e. boosted voltage level) than the rectified input voltage 120. Controller IC 150 maintains voltage regulation of the voltage stage 110 via control of the ON and OFF states of transistor Q10 via a control signal output from the BDRV pin (pin 4) of the controller 150. Transistor Q10 is ON when operated in its saturation region and OFF when operated in its cutoff region.

In some embodiments, controller 150 may also operate transistor Q10 in its forward active region as a linear regulator by regulating the base current to transistor Q10 via the control signal output from the BDRV pin of the controller 150. When transistor Q10 is operated as a linear regulator, it provides a bleeding current for a dimmer switch (not shown) coupled to the LED lamp 100 that provides the AC voltage VAC. In other embodiments, transformer T8 can be replaced with other types of electrical components that store energy in a magnetic field, such as an inductor.

The current regulation stage 115 is coupled to an output of the voltage regulation stage 110 and is comprised of transformer T7, transistor switch Q11, diode D31, and capacitor C38, among other components. The current regulation stage 115 receives the regulated voltage 122 and regulates current through the LED string 120. Controller IC 150 maintains output regulation of the current regulation stage 115 via control of the ON and OFF states of switch Q1 via a control signal output from the FDRV pin (pin 10) of controller IC 150.

The ASU stage 125 is coupled to the front end stage 105 and is comprised of resistor R71, resistor R86, resistor R67, resistor R77, transistor Q12 and diode D32. ASU stage 125 provides a source of power for the power supply voltage VCC of the controller 150 when the controller 150 is first starting up. The controller 150 enables the ASU stage 125 by floating the ASU pin (pin 6). The base current through the transistor Q12 creates a collector-emitter current (powered by Vrec 120) that charges the capacitor C37. Controller 150 disables the ASU stage by pulling the base of the transistor Q12 to ground via a control signal from the ASU pin (pin 6). Once the controller 150 is fully operational and the current regulation stage 115 is enabled, the power supply voltage VCC is powered by the current regulation stage 115 instead of the ASU stage 125.

LED lamp controller 150 is coupled to the various stages of the LED lamp 100 and controls the operation of the voltage regulation stage 110, the current regulation stage 115, and the active startup stage 125. In one embodiment, LED lamp controller 150 is an integrated circuit (IC), such as an application specific integrated circuit (ASIC).

The LED lamp controller 150 receives various feedback signals that it uses in controlling the LED lamp 100. The VIN pin (pin 2) receives an input voltage feedback signal indicative of the rectified input voltage 120. The boost voltage sense (BVSNS) pin (pin 1) receives a boost voltage feedback signal indicative of the voltage across the transformer T8. The boost current sense (BISNS) pin (pin 3) receives a boost current feedback signal indicative of a current in transformer T8. The flyback current sense (FISNS) pin (pin 11) receives a feedback signal indicative of a current in the primary winding of the transformer T7. The flyback voltage sense (FVSNS) pin (pin 12) receives a feedback signal indicative of a voltage across an auxiliary winding of the transformer T7.

LED lamp controller 150 operates in power cycles that are controlled by a level of the power supply voltage VCC. The beginning of a power cycle may occur as the power supply voltage VCC rises above a reset threshold voltage (e.g. 6.5 V). Sometime during the power cycle, a fault condition may be detected and cause VCC to fall below the reset threshold voltage. The end of a power cycle occurs as the power supply voltage VCC falls below the reset threshold voltage.

Each power cycle includes different power states such as: a reset state, a configuration state, a regulation state, and a fault state. When the power supply voltage VCC is below the reset threshold voltage (e.g. <6.5 V), LED lamp controller 150 is in a reset state. LED lamp controller may be in a reset state, for example, when VAC is first provided to the LED lamp 100. During reset state, most of the logic in the LED lamp controller is disabled and the output pins of the LED lamp controller are not actively driven. The ASU pin is thus allowed to float, which enables the ASU stage 125 and gradually increases the VCC voltage level to a turn-on threshold voltage (e.g. 12V).

Once the VCC has reached a turn-on threshold voltage (e.g. >12 V), the LED lamp controller 150 exits the reset state and enters a configuration state in order to initiate the start up process for the LED lamp controller 150. During the configuration state, the LED lamp controller 150 initiates one or more internal parameters that affect the operation of the LED lamp controller 150 during the later regulation state. The parameters may be stored in configuration registers (not shown) within the LED lamp controller 150 that do not retain their information during the reset state. Also, the control signals from the BDRV and/or FDRIV pins may not yet be driven during the configuration state so that current is not provided to the LEDs 120.

In one embodiment, one of the parameters is a dimmer type parameter that indicates a type of dimmer switch (not shown) that is coupled to the LED lamp 100. To detect the type of the dimmer switch, during the configuration state, the LED lamp controller 150 may operate transistor Q10 in its forward-active region to draw a bleeding current from the dimmer switch. The shape of the AC input voltage VAC, as reflected in the rectified input voltage 120, is used by the LED lamp controller 150 to determine a type of dimmer (e.g., leading edge phase angle switching, trailing edge phase angle switching, or no dimmer) that is providing the AC input voltage VAC. Operating the transistor Q10 in its forward-active region may consume a non-trivial amount of power due to the inefficiencies of a linear current sink, so minimizing the time spent in the configuration state reduces the stress on the transistor Q10. Once the dimmer type is known, information about the dimmer type may be used during the regulation state to control the operation of transistor Q10, as will be explained herein.

In other embodiments, these internal parameters may affect how the LED lamp controller 150 drives the control signal output by the BDRV pin or the control signal output by the FDRV pin to control the voltage regulation stage 110 or current regulation stage 115 during the regulation state. As another example, these internal parameters may affect how the LED lamp controller 150 processes the various feedback signals during the regulation state. Some of these internal parameters may be determined by the configuration of circuitry, such as resistors and capacitors, that are external to the LED lamp controller 150.

After the configuration state is completed, the LED lamp controller 150 enters the regulation state to begin regulating the regulated voltage 122 and current flowing through the LEDs 120. During the regulation state, LED lamp controller 150 controls the voltage regulation stage 110 by switching transistor Q10 ON and OFF to generate a regulated voltage 122. Also during the regulation state, LED lamp controller 150 controls the current regulation stage 115 by switching transistor switch Q11 ON and OFF. The secondary winding of the transformer T7 now provides power for VCC via diode D30. The ASU stage 125 is no longer needed to provide power for VCC, so the control signal from the ASU pin disables transistor Q12.

In one embodiment, when a dimmer switch is present, portions of the rectified input voltage 120 waveform will be cut-off by a phase cut as the level of the dimming increases due to phase angle switching. In portions of the waveform that are not cut-off, transistor Q10 is operated in switching mode by switching transistor Q10 ON and OFF to generate a regulated voltage 122. In portions of the waveform that are cut-off, the transistor Q10 is operated in linear mode to provide a bleeding current path to the dimmer switch. This is because certain dimmer switches do not function properly without a bleeding current path. In one embodiment, during the regulation state, the LED lamp controller 150 adjusts the timing of the transition between the switching mode and linear mode of the transistor Q10 according to whether the dimmer switch is a leading edge or trailing edge type dimmer switch employing phase angle switching.

The LED lamp controller 150 is also configured to detect fault conditions in circuitry of the LED lamp 10 that can be either internal to or external to the LED lamp controller 150. When a fault condition is detected, the LED lamp controller 150 enters a fault state, during which it stops driving most of its output pins in order to shut down the LED lamp 100. The ASU control signal from the ASU pin is kept low to disable the ASU stage 125. Because both the ASU stage 125 and the current regulation stage 115 are disabled, no source of power is available for powering VCC. As a result, VCC decreases until is sinks below the reset threshold (e.g. <6.5V), at which point the controller 150 enters the reset state, VCC rises above the reset threshold again, and the power cycle is repeated.

Because fault conditions tend to re-occur, during later power cycles after a fault condition is detected, the LED lamp controller 150 introduces a startup delay to delay proper startup of the LED lamp controller 150. The startup delay can be a length of time between when the fault condition was detected and when the configuration state is allowed to fully complete in a later power cycle, as measured by a number of power cycles during which the configuration state is preventing from completing. The delay reduces stress on components such as switch Q10. Advantageously, the LED lamp controller 150 detects different types of fault conditions and sets the delay differently depending on the type of the fault condition. More severe fault conditions may result in a longer delay, and less severe fault conditions may result in a shorter delay. Thus, the LED lamp controller 150 can apply different fault control policies to different types of fault conditions that strike a balance between power efficiency and delay in recovering from fault conditions.

In one embodiment, the delay can be implemented by forcing the LED lamp controller 150 to enter the fault state soon after exiting the reset state over a number of power cycles. Forcing the controller 150 into the fault state effectively prevents the configuration state from being initiated or cuts off the configuration state before it completes, thereby reducing a duty cycle of the configuration state in later power cycles. The duty cycle of the configuration state refers to the duration of time during which the LED controller spends in the configuration state as a fraction of the duration of the entire power cycle. The total number of power cycles during which the configuration state duty cycle is restricted is effectively the startup delay.

Additionally, when a fault condition is detected in a power cycle, the LED lamp controller 150 stores fault type information indicating a type of the fault condition that was detected. The fault type information is stored in a portion of the controller 150 that retains data across different power cycles so that the information is not lost when the controller 150 enters the reset state. Thus, in subsequent power cycles, this fault type information can be read and used by the LED lamp controller in determine how to set the startup delay.

Figure 2:
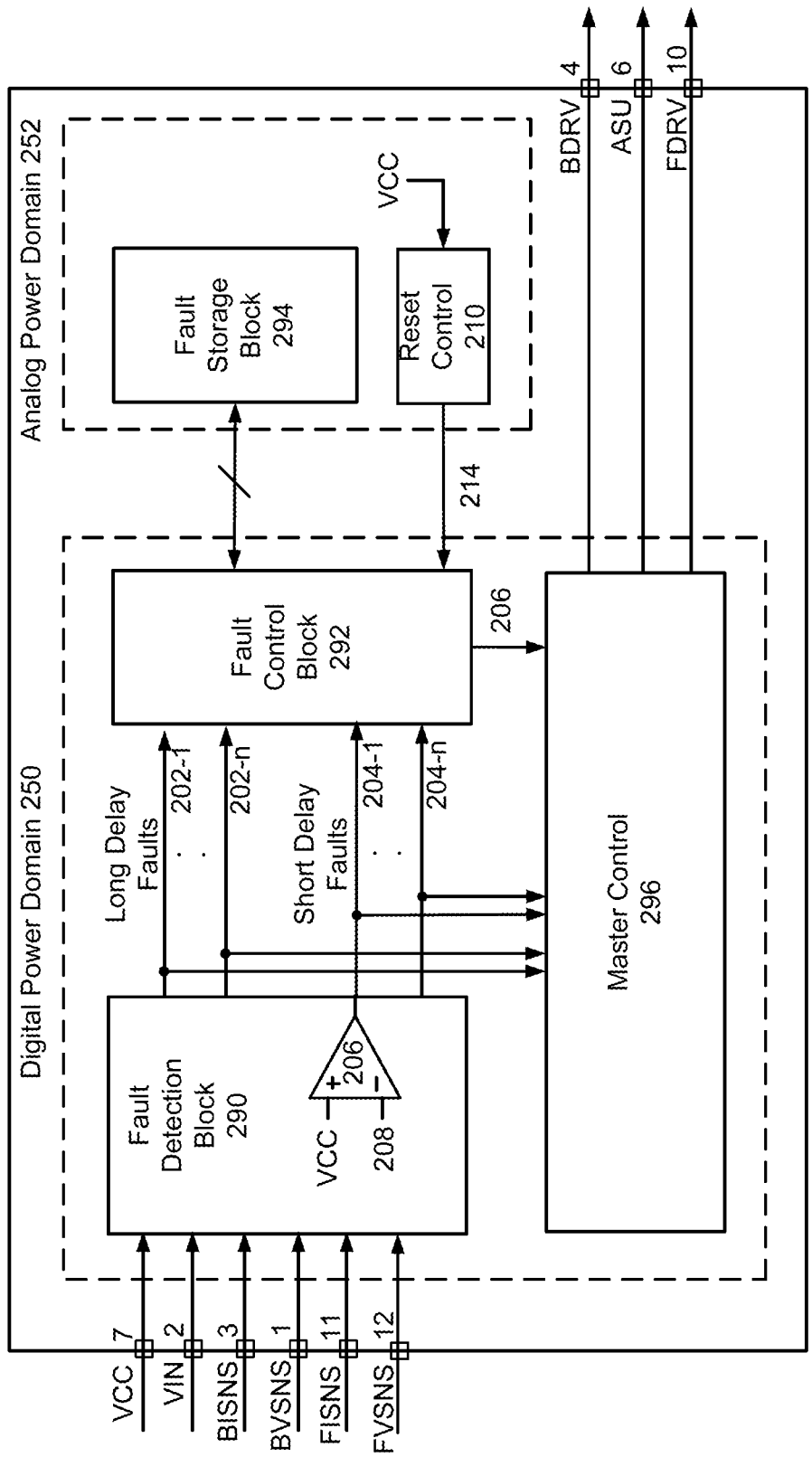
FIG. 2 illustrates a detailed view of the LED lamp controller, according to an embodiment.

FIG. 2 illustrates a detailed view of the LED lamp controller 150, according to an embodiment. In other embodiments, there may be other components and additional connections that are not shown in FIG. 2. The controller 150 can be divided into two power domains, referred to herein as the digital power domain 250 and the analog power domain 252. Note that the domains are referred to as "digital" and "analog" simply for convenience, but both power domains can include digital circuitry. In one embodiment, the blocks of each power domain can be implemented with circuits.

Each of the power domains is reset at a different level of the VCC voltage. Specifically, reset control block 210 generates a reset signal 214 for the digital domain 250 to put the controller 150 into the reset state. The reset signal 214 is asserted to reset the digital power domain 250 when the VCC voltage falls below a reset threshold (e.g. 6.5 V). The reset signal is de-asserted when the VCC voltage rises above a turn-on threshold (e.g. 12 V). On the other hand, the analog power domain 252 is not reset until VCC falls below a very low threshold level (e.g. 3.3 V) that is lower than the reset threshold level 212. This may occur when there is no AC input voltage VAC to the lamp. In other embodiments, the analog power domain 252 may be reset by a dedicated reset signal (not shown) for the analog power domain 252. In one embodiment, the digital power domain 250 and the analog power domain 252 may be powered by the same or different internal power rails of the controller 150.

The digital domain 250 includes a fault detection block 290 that detects the presence of fault conditions using various feedback signals from the input pins (VCC, VIN, BISNS, BVSNS, FISNS, FVSNS) and outputs fault signals 202 and 204 that represent different fault conditions. In one embodiment, the fault conditions can be divided into two types of fault conditions: long delay fault conditions and short delay fault conditions. Long delay fault conditions are indicated by long delay fault signals 202. Short delay fault conditions are indicated by short delay fault signals 204.

Example of long delay fault conditions can be that some of the pins of the current regulation stage 115 are shorted, that one or more LEDs in the LED string 120 is an open circuit, that the entire LED string 120 is shorted, that the temperature of the LED lamp is too high as determined by an external thermistor, etc. For example, the fault condition in which the entire LED string 120 is shorted can be detected once the current regulation stage 115 is enabled. If the current regulation stage 115 is enabled to deliver current to the LED string 120 but the voltage feedback signal from pin FVSNS has no voltage, this indicates that the entire LED string 120 is shorted.

Examples of short delay fault conditions can be that the AC input voltage VAC is too low or that some but not all of the LEDs in the LED string 120 are shorted. Both of these fault conditions have the same fault symptom, which is that the VCC voltage drops quickly after exiting the reset state. In one embodiment, both of these short delay fault conditions can be detected by comparing the VCC voltage to a reference voltage 208 using a comparator 206. The reference voltage 208 has a threshold voltage level (e.g. 7 V) that is higher than the reset threshold voltage level (6.5V). If VCC drops below REF, the output of the comparator 206 changes states to indicate the presence of a fault condition.

Beneficially, by detecting a fault condition with comparator 206, LED lamp controller 150 can be made aware that VCC is reaching dangerously low levels and register a fault before VCC falls below the reset threshold (6.5V). Without comparator 206, a fault condition such as some of the LEDs of LED string 120 being shorted would cause the LED lamp controller 150 to be reset without ever registering a fault. The LED lamp controller 150 would thus cycle through reset and configuration states over and over again without detecting a fault, thereby increasing the thermal stress on components external to the LED lamp controller 150.

Additionally, treating a fault condition in VCC as a short delay fault condition allows a human user to turn the LED lamp 100 off and on very quickly with a light switch that provides the AC input voltage VAC. Removing the AC input voltage VAC to turn off the LED lamp 100 causes VCC to decrease and triggers a fault condition at the output of comparator 206. If the output of comparator 206 is treated as a long delay fault condition, a long delay (e.g. >3 seconds) is introduced before the LED lamp 100 is allowed to complete the startup process. This long delay prevents the LED lamp 100 from being instantly turned off and then back on, resulting in an unpleasant user experience. By using the output of comparator 206 as a short delay fault condition, this long delay can be avoided while still providing the requisite fault protection against some of the LEDs of the LED string 120 being shorted.

Fault control block 292 receives the fault indication signals 202 and 204 and stores information in the fault storage block 294 indicating that a fault condition was detected and the type of the fault condition (e.g., short or long fault). The fault control block 292 reads back this information in later power cycles to generate a previous fault signal 206 that indicates whether to power down the controller 150 due to a fault being detected in a previous power cycle. The number of power cycles during which the previous fault signal 206 is asserted is determined by the type of the fault that was previously detected. For example, short delay faults may cause the previous fault signal to be asserted during 3 power cycles, whereas long delay faults may cause the previous fault signal to be asserted during 28 power cycles. In other words, the fault control block 292 controls the startup delay after a fault condition is detected based on the type of fault condition detected in previous power cycles. In other embodiments, the type of fault conditions is not restricted to short type faults and long type faults, but may also refer to other types of fault conditions, such as internal circuitry faults, external circuitry faults, voltage stage faults, current stage faults, etc.

As the fault storage block 294 is stored in the analog power domain 252 and the analog power domain 252 is not reset when the supply voltage level VCC drops below the reset threshold (e.g. 6.5 V), the information about the type of the fault is retained across different power cycles. Beneficially, retaining the fault type information in the analog power domain 252 prevents the fault type information from being lost, even as VCC drops below the reset threshold voltage (e.g. 6.5 V) between power cycles, which enables the fault type information to be retrieved and used in later power cycles.

The master control block 296 configures different parameters of the LED lamp controller 150 during the configuration state. During the regulation state, the master control block 296 also controls components that are external to the LED lamp controller 150 via pins such as the BDRV pin, ASU pin, and FDRV pin. Additionally, the master control block 296 may receive various feedback signals from the input pins of the LED lamp controller 150 and use the feedback signals during the configuration or regulation states to perform parameter configuration or to regulate the current to the LED string 120.

The master control block 296 enters the fault state to shutdown the controller IC when the previous fault signal 206 is asserted to indicate the existence of a previous fault condition. The master control block 296 also enters a fault state if any of the fault signals 202 and 204 indicate the existence of a current fault condition.

Figure 3:
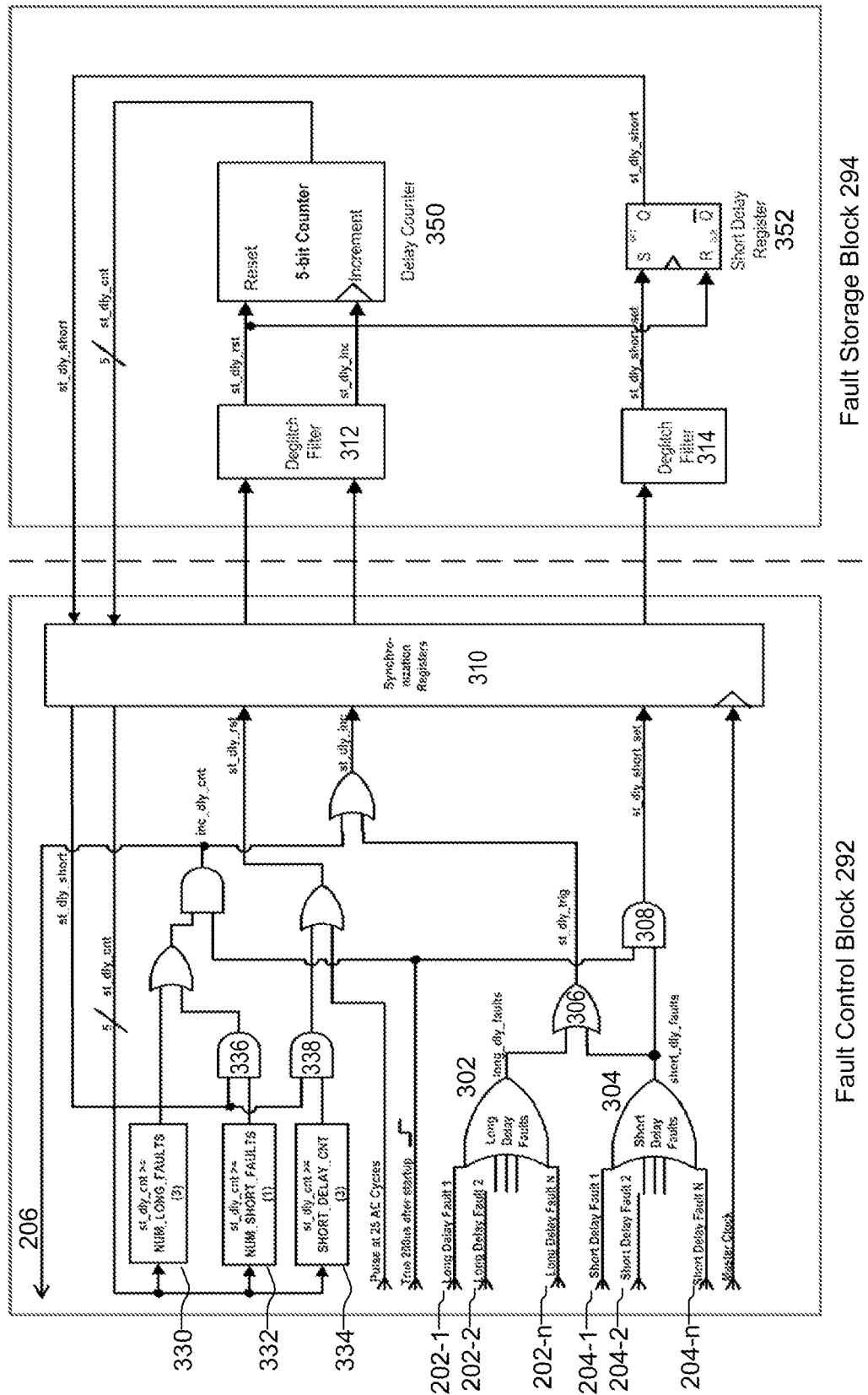
FIG. 3 is a more detailed view of the fault control block and fault storage block of the LED lamp controller, according to an embodiment.

FIG. 3 is a more detailed view of the fault control block 292 and fault storage block 294 of the LED lamp controller 150, according to an embodiment. In the fault control block 292, OR logic gate 302 combines all of the long delay fault signals 202-1 to 202-n to generate a long_dly_faults signal that indicates the presence of a long delay fault condition. OR logic gate 304 combines all of the short delay fault signals 202-1 to 202-n to generate a short_dly_faults signal that indicates the presence of a short delay fault condition. OR logic gate 306 generates a st_dly_trig signal that indicates the presence of a fault condition, regardless of whether the fault is a short delay fault or a long delay fault. The presence of a fault condition is used to increment the five-bit delay counter 350 in the fault storage block 294 via the st_dly_inc signal. The counter 350 thus stores information indicating whether a fault condition was recently detected.

AND logic gate 308 outputs a st_dly_short_set signal indicating the presence of a short delay fault condition after the digital domain 250 exits reset. The presence of a short delay fault condition is used to set the state of the short delay register 352. The short delay register 352 thus stores information about the type of fault condition that is detected. If the value of the register 352 is logic 1, it indicates that any detected fault condition is a short delay fault. If the value of the register 352 is logic 0, it indicates that any detected fault condition is a long delay fault.

The value of the counter 350 is read by the fault control block 292 via signals st_dly_cnt. The value of the short delay register 352 is read by the fault control block via signal st_dly_short. Generally speaking, if st_dly_short indicates the existence of a long delay fault, the previous fault signal 206 will be asserted in a large number of power cycles to prevent the controller 150 from fully starting up for a long amount of time. On the other hand, if st_dly_short indicates the existence of a short delay fault, the previous fault signal 206 will be asserted in just a few power cycles to prevent the controller 150 from fully starting up for a shorter amount of time.

With respect to long fault conditions, three long fault conditions in a row are required before the fault control block 292 delays the controller from fully starting up for 28 power cycles. A 28 power cycle delay is fairly significant, so waiting for three long faults before triggering the startup delay ensures that the long fault condition is actually persistent before allowing the long startup delay to occur. Counter evaluation circuit 330 handles long fault conditions. Counter evaluation circuit 330 determines if the value of the counter 350 is greater than three. If so, inc_dly_cnt signal is asserted to increment the counter 350. This also causes the previous fault signal 206 to be asserted and places the controller 150 into the fault state.

With respect to short fault conditions, only a single short fault condition is required before the fault control block 292 delays the controller 150 from fully starting up for two power cycles. This is because a two cycle the startup delay is relatively short so triggering the startup delay after a single short fault condition does not severely impact the speed with which the LED lamp controller 100 can recover from the fault condition. Counter evaluation circuits 332 and 334 and AND logic gates 336 and 338 handle short fault conditions. Counter evaluation circuit 332 determines if the value of the counter 350 is greater than or equal to 1. If so, inc_dly_cnt is asserted to increment the counter 350. This also causes the previous fault signal 206 to be asserted and places the controller 150 into the fault state. Counter evaluation circuit 334 determines if the value of the counter 350 is greater than or equal to 3. If so, st_dly_rst is asserted to clear out the counter 350 and short delay register 352.

Synchronization registers 310 output and receive signals from the fault storage block 294 at synchronized time-points controlled by the Master Clock. Deglitching filters 312 and 314 remove glitches from signals output by the synchronization registers 310. Additionally, a pulse is generated 25 AC cycles after the LED lamp controller 150 exits the reset state to clear out the counter 350 and short delay registers 352. The pulse is generated because if the 25 AC cycles have passed, it is assumed that the LED lamp controller 150 has started up successfully so the information about past faults can be cleared out.

Figure 4A:
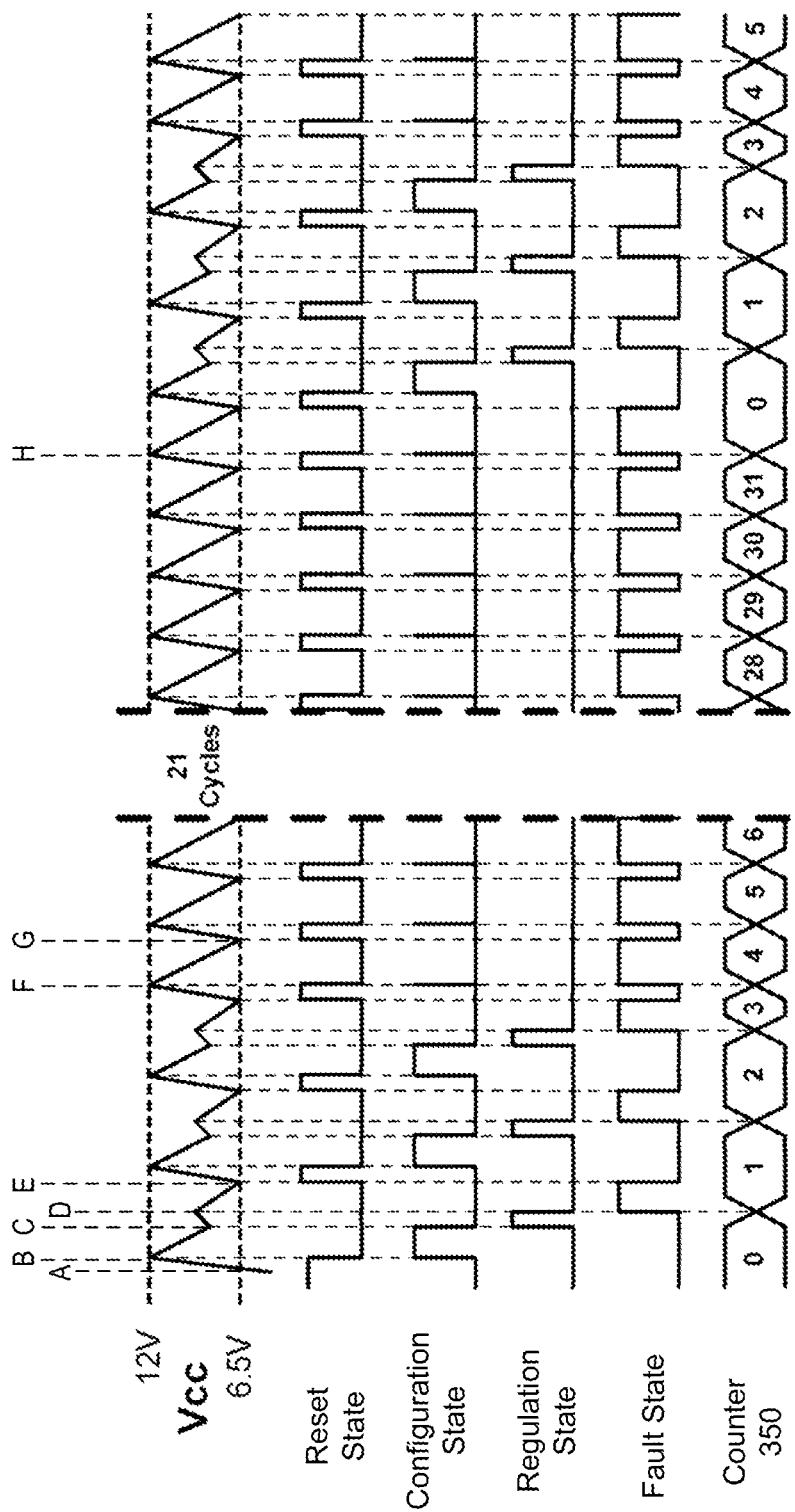
FIG. 4A is a timing diagram for the LED lamp controller when a long fault is detected, according to an embodiment.

FIG. 4A is an exemplary timing diagram for the LED lamp controller 150 when a long fault is detected, according to an embodiment. FIG. 4A will be explained by reference to FIGS. 2 and 3. It also noted that in FIG. 4A, the reset state, configuration state, regulation state, and fault state are shown as logic waveforms that represent the status of the different states. When a particular state is shown as being logic high, it means that the LED lamp controller 150 is in that particular state. When a particular state is shown as being logic low, it means that the LED lamp controller 150 is not in that particular state.

At time A, VCC is increasing and the LED lamp controller 150 is in a reset state. At time B, VCC reaches the turn-on voltage of 12V. LED lamp controller 150 exits the reset state and enters the configuration state as the reset signal 214 is deasserted. At time C, the configuration state is complete and so the LED lamp controller 150 exits the configuration state and enters the regulation state.

At time D, a long fault condition is detected, for example, due to a fault somewhere in the LED lamp 100. The fault control block 292 increments the counter 350 in the fault storage block by a value of 1. The LED lamp controller 150 also exits the configuration state and enters the fault state. Between time D and E, VCC drops because the controller 150 is in a fault state so both the ASU stage 125 and the current regulation stage 115 are disabled. At time E, VCC falls below the reset threshold of 6.5V and the controller 150 enters the reset state again.

The process described with respect to time A through time E repeats in the same way until the counter 350 has a value of 3. At time F, when the controller 150 exits the reset state, counter evaluation circuit 330 determines that the counter 350 has a value of 3. The inc_dly_cnt signal is immediately asserted, which causes previous fault signal 206 to indicate that the controller 150 should be placed into a fault state. As a result, the configuration state is cut off immediately after it begins. Alternatively, the previous fault signal 206 may prevent the controller 150 from even starting the configuration state. Asserting the inc_dly_cnt signal also increments the counter 350 to a value of 4.

Between time G and H, the controller 150 repeatedly enters the reset state and is immediately placed into the fault state upon exiting the reset state to prevent the configuration state from completing. In each cycle, the counter 350 is incremented by one. At time H the counter finally reaches its maximum value of 31 and rolls over to a value of 0. The process described with respect to time A through time H now repeats because the fault condition still exists.

Figure 4B:
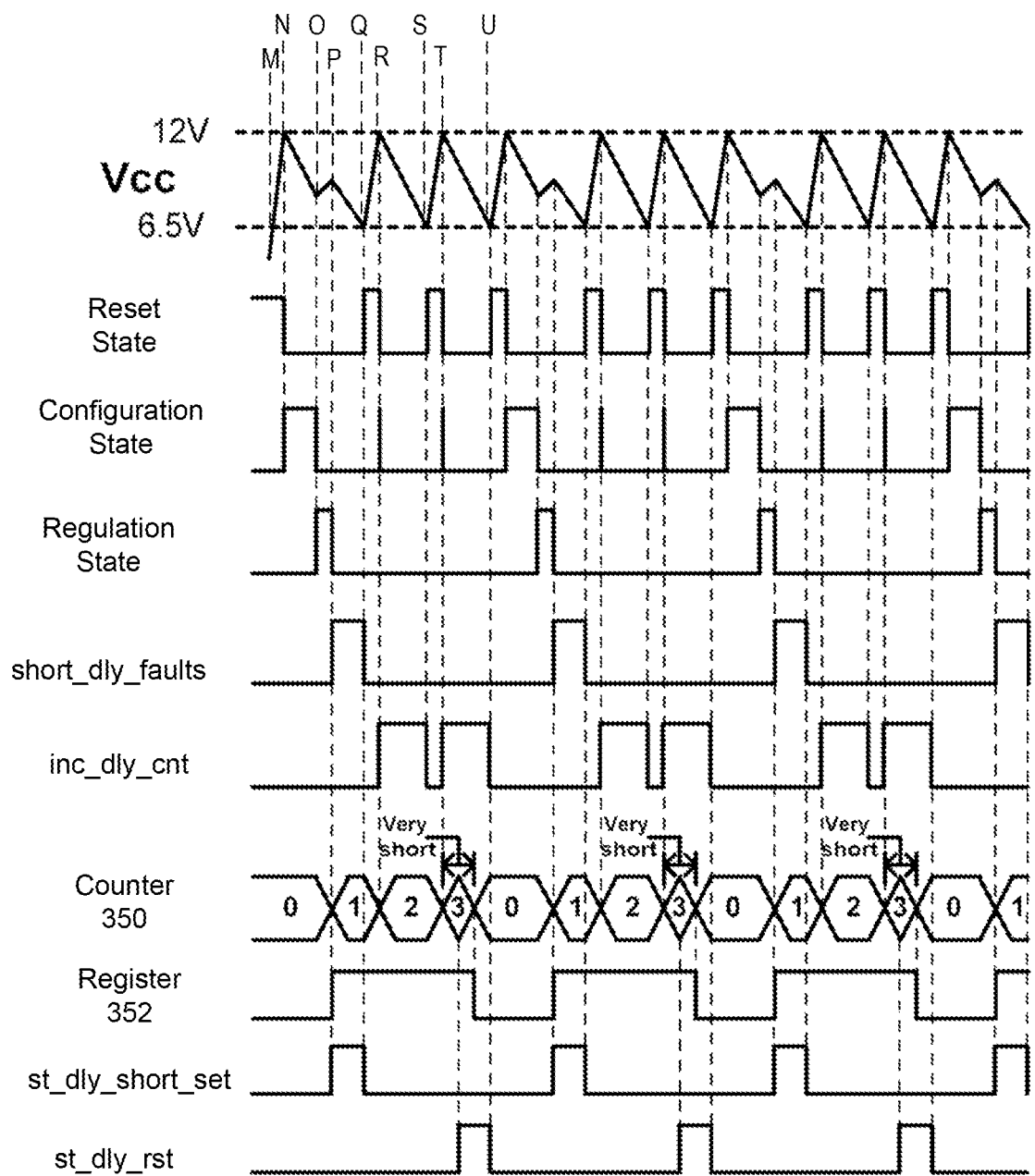
FIG. 4B is a timing diagram for the LED lamp controller when a short fault is detected, according to an embodiment.

FIG. 4B is a timing diagram for the LED lamp controller 150 when a short fault is detected, according to an embodiment. FIG. 4B will be explained by reference to FIGS. 2 and 3. At time M, VCC is increasing and the LED lamp controller 150 is in a reset state. At time N, VCC reaches the turn-on voltage of 12V. LED lamp controller 150 exits the reset state and enters the configuration state as the reset signal 214 is deasserted. At time O, the LED lamp controller 150 exits the configuration state and enters the regulation state.

At time P, a short fault condition is detected, for example, due to a fault in the LED lamp 100. The fault control block 292 increments the counter 350 in the fault storage block by a value of 1. The controller 150 also exits the configuration state and enters the fault state. Additionally, the detection of the short fault condition causes the short_dly_faults signal to be asserted, which sets the register 352 to a value of 1 to indicate that the type of fault detected is a short fault.

Between time P and time Q, the voltage level of VCC drops because the controller 150 is in a fault state and the ASU pin is not being driven by the controller 150. At time Q, VCC falls below the reset threshold of 6.5V and the controller 150 enters the reset state.

At time R, the controller 150 exits the reset state and briefly enters the configuration state before it is placed into the fault state. Specifically, counter evaluation circuit 332 determines that the counter 350 has a value that is greater than or equal to 1. Because the value of register 352 indicates that a short delay fault condition was detected, AND gate 336 causes inc_dly_cnt to be asserted. Asserting the inc_dly_cnt signal causes previous fault signal 206 to indicate that the controller 150 should be placed into a fault state. As a result, the configuration state is cut off immediately after it begins. Alternatively, the previous fault signal 206 may prevent the controller 150 from even starting the configuration state. Asserting the inc_dly_cnt signal also increments the counter 350 by 1 to a value of 2.

Between time R and S, VCC drops because the controller 150 is in a fault state. At time S, VCC falls below the reset threshold of 6.5V and the controller 150 enters the reset state.

At time T, the controller 150 exits the reset state and briefly enters the configuration state before it is placed into the fault state. The operation of the controller 150 at time T is similar to that described at time R, except that the counter 350 is now incremented to a value of 3. Additionally, shortly after time T, counter evaluation circuit 334 determines that the value of the counter 350 is greater than or equal to 3, which causes st_dly_rst to be asserted. The assertion of st_dly_rst resets counter 350 and register 352 to 0.

At time U, the operation of the controller 150 described with respect to time M through time T is now repeated because the fault condition still persists.

Beneficially, the disclosed embodiments allow for delayed startup after a fault condition is detected. Different types of fault conditions can result in different delay lengths. Fault type information is stored in circuitry that retains data and is not reset across the power cycles. Additionally, the fault detection circuitry may detect a fault condition by comparing VCC to a threshold voltage that is above the reset threshold voltage, which allows for detection of faults that would otherwise cause power cycling without being detected.

Upon reading this disclosure, those of skill in the art will appreciate still additional alternative designs for delaying startup under fault conditions. In other embodiments, the LED lamp may be any type of light emitting lamp and the LED controller may controller other types of light emitting devices other than LEDs. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the present disclosure.

What is claimed is:

1. A light emitting diode (LED) lamp, comprising:
one or more LEDs configured to emit light in accordance with current flowing through the LEDs; and
a LED lamp controller configured to generate a control signal for regulating the current flowing through the LEDs, the LED lamp controller operating in power cycles according to a voltage level of a supply voltage, each power cycle including a configuration state during which one or more parameters affecting operation of the LED lamp controller are initialized,
wherein the LED lamp controller is configured to detect a type of a fault condition of the LED lamp during a first power cycle of the power cycles, and
wherein the LED lamp controller is configured to prevent completion of the configuration state in second power cycles of the power cycles that are subsequent to the first power cycle, the LED lamp controller configured to control a number of the second power cycles during which completion of the configuration state is prevented based on the type of the fault condition.

2. The LED lamp of claim 1, wherein during the configuration state, the LED lamp controller is configured to initiate a parameter that indicates a type of dimmer switch coupled to the LED lamp.

3. The LED lamp of claim 2, further comprising:
a transistor coupled to an input voltage of the LED lamp, and
wherein during the configuration state, the LED lamp controller is configured to initiate the parameter that indicates the type of dimmer switch connected to the LED lamp by generating a control signal that operates the transistor in its forward-active region to draw current from the dimmer switch coupled to the LED lamp and detecting the type of the dimmer switch based on the input voltage to the LED lamp.

4. The LED lamp of claim 1, wherein each power cycle begins as the supply voltage rises above a threshold voltage and ends as the supply voltage falls below the threshold voltage.

5. The LED lamp of claim 1, wherein a first portion of the LED lamp controller is reset across the power cycles and a second portion of the LED lamp controller is not reset across the power cycles, the LED lamp controller is configured to store information about the type of the fault condition in the second portion of the LED lamp controller, and the LED lamp controller is configured to control the number of the second power cycles during which completion of the configuration state is prevented based on the information about the type of the fault condition stored in the second portion of the LED lamp controller.

6. The LED lamp of claim 1, wherein:
responsive to the type of the fault condition being a first type of fault condition, the LED lamp controller is configured to prevent completion of the configuration state in the second power cycles for a first pre-determined number of second power cycles, and
responsive to the type of the fault condition being a second type of fault condition, the LED lamp controller is configured to prevent completion of the configuration state in the second power cycles for a second pre-determined number of the second power cycles that is greater than the first pre-determined number of second power cycles.

7. The LED lamp of claim 6, wherein the first type of fault condition includes a fault in the supply voltage.

8. The LED lamp of claim 6, wherein the second type of fault condition includes a fault in a voltage feedback signal to the LED lamp controller.

9. The LED lamp of claim 1, wherein the LED lamp controller is configured to prevent completion of the configuration state in the second power cycles by shutting down the LED lamp controller prior to starting the configuration state in the second power cycles.

10. The LED lamp of claim 1, wherein the LED lamp controller is configured to prevent completion of the configuration state in the second power cycles by shutting down the LED lamp controller to discontinue the configuration state in the second power cycles after starting the configuration state in the second power cycles.

11. A method of operation in a light emitting diode (LED) lamp, the LED lamp comprising one or more LEDs configured to emit light in accordance with current flowing through the LEDs, the LED lamp further comprising a LED lamp controller configured to generate a control signal for regulating the current flowing through the LEDs, the LED lamp controller operating in power cycles according to a voltage level of a supply voltage, each power cycle including a configuration state during which one or more parameters affecting operation of the LED lamp controller are initialized, the method comprising:
 detecting a type of a fault condition of the LED lamp during a first power cycle of the power cycles, and
 preventing completion of the configuration state in second power cycles of the power cycles that are subsequent to the first power cycle, wherein a number of the second power cycles during which completion if the configuration state is prevented is controlled based on the type of the fault condition.

12. The method of claim 11, wherein during the configuration state, the LED lamp controller is configured to initiate a parameter that indicates a type of dimmer switch coupled to the LED lamp.

13. The method of claim 11, wherein each power cycle begins as the supply voltage rises above a threshold voltage and ends as the supply voltage falls below the threshold voltage.

14. The method of claim 11, wherein a first portion of the LED lamp controller is reset across the power cycles and a second portion of the LED lamp controller is not reset across the power cycles, and the method further comprises:
 storing information about the type of the fault condition in the second portion of the LED lamp controller,
 wherein the number of the second power cycles during which completion if the configuration state is prevented is controlled based on the information about the type of the fault condition stored in the second portion of the LED lamp controller.

15. The method of claim 11, wherein preventing completion of the configuration state in the second power cycles comprises:
 responsive to the type of the fault condition being a first type of fault condition, preventing completion of the configuration state during the second power cycles for a first number of the second power cycles; and
 responsive to the type of the fault condition being a second type of fault condition, preventing completion of the configuration state during the second power cycles for a second number of the second power cycles that is greater than the first number of the second power cycles.

16. The method of claim 15, wherein the first type of the fault condition includes a fault in the supply voltage.

17. The method of claim 15, wherein the second type of the fault condition includes a fault in a voltage feedback signal to the LED lamp controller.

18. The method of claim 11, wherein preventing completion of the configuration state in the second power cycles comprises:
 shutting down the LED lamp controller prior to starting the configuration state in the second power cycles.

19. The method of claim 11, wherein preventing completion of the configuration state in the second power cycles comprises:
 shutting down the LED lamp controller to discontinue the configuration state in the second power cycles after starting the configuration state in the second power cycles.

20. A light emitting diode (LED) lamp controller for an LED lamp, comprising:
 a control pin configured to generate a control signal for regulating current flowing through one or more LEDs of the LED lamp; and
 a power supply pin configured to receive a supply voltage, the LED lamp controller operating in power cycles according to a voltage level of the supply voltage, each power cycle including a configuration state during which one or more parameters affecting operation of the LED lamp controller are initialized,
 wherein the LED lamp controller is configured to detect a type of a fault condition of the LED lamp during a first power cycle of the power cycles, and
 wherein the LED lamp controller is configured to prevent completion of the configuration state in second power cycles of the power cycles that are subsequent to the first power cycle, the LED lamp controller configured to control a number of the second power cycles during which completion of the configuration state is prevented based on the type of the fault condition.

21. The LED lamp controller of claim 20, wherein during the configuration state, the LED lamp controller is configured to initiate a parameter that indicates a type of dimmer switch coupled to the LED lamp.

* * * * *